Feb. 15, 1966  R. H. SCHLIDT ET AL  3,235,041
EMERGENCY CUTTER

Filed Sept. 21, 1960  4 Sheets-Sheet 1

INVENTORS
RUDOLPH H. SCHLIDT
FRITZ K. PAULI
BY Cushman, Darby & Cushman
ATTORNEY Feb. 15, 1966  R. H. SCHLIDT ET AL  3,235,041
EMERGENCY CUTTER Filed Sept. 21, 1960  4 Sheets-Sheet 2

INVENTORS
RUDOLPH H. SCHLIDT
FRITZ K. PAULI

BY Cushman, Darby + Cushman
ATTORNEY

Feb. 15, 1966  R. H. SCHLIDT ET AL  3,235,041
EMERGENCY CUTTER

Filed Sept. 21, 1960  4 Sheets-Sheet 3

INVENTORS
RUDOLPH H. SCHLIDT
FRITZ K. PAULI
BY Cushman, Darby + Cushman
ATTORNEY

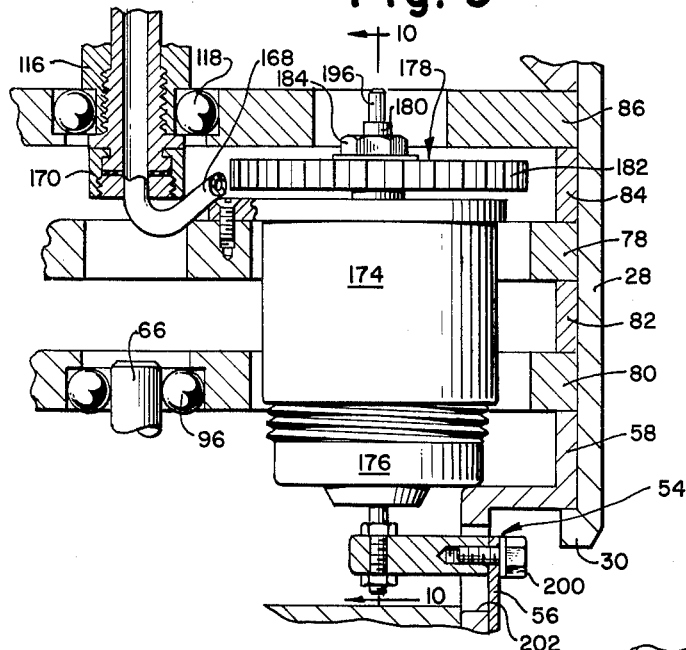
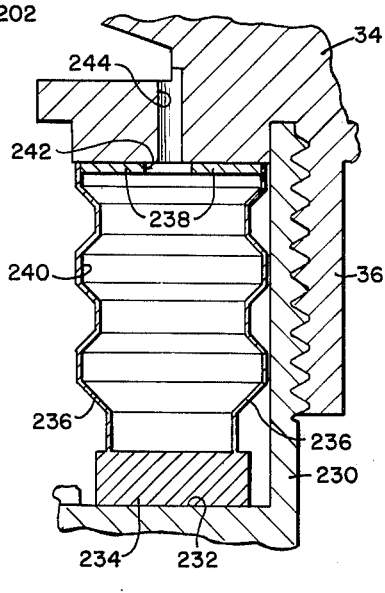
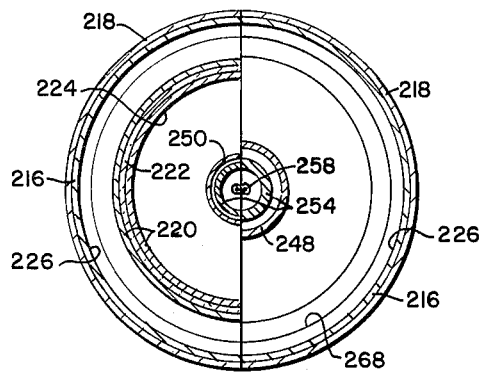

United States Patent Office

3,235,041
Patented Feb. 15, 1966

3,235,041
EMERGENCY CUTTER
Rudolf H. Schlidt and Fritz K. Pauli, both of
3306 Panorama Drive SE., Huntsville, Ala.
Filed Sept. 21, 1960, Ser. No. 57,439
17 Claims. (Cl. 192—.096)

This invention relates to cutters and more particularly to apparatus for cutting through bulkheads, fuselages, and the like, under emergency conditions for the purpose of gaining access to personnel and equipment.

In recent years, there have been numerous news stories relating instances where automobile, airplane, and train and other accidents have occurred and personnel have been lost because they were trapped within a vehicle or other enclosure and could not be freed in time to be saved. This is particularly true of accidents involving vehicles in the water. There has been no satisfactory piece of equipment available which could perform the function of cutting through airplane fuselages, automobile bodies, train and boat bulkheads and the like under emergency conditions to prevent the loss of life and valuable equipment. The present invention has for its object the provision of a cutting apparatus capable of performing this function. It should be understood that apparatus for rapidly cutting through metal bulkheads must be capable of generating considerable power even though such power need not be available for great lengths of time. Moreover, the power source must be portable and cannot be dependent upon the existence of electrical outlets or the provision of internal combustion engine fuel or the like. The present invention is based upon the proposition that these criteria can best be met by supplying the required power in the form of a gas pressure-producing propellant, such as a rocket propellant or the like.

Accordingly, it is an object of the present invention to provide an emergency cutting device of the type described which is truly portable, and is capable of high power operation for a limted period of time, sufficient to perform emergency cutting operations on metallic bulkheads and the like.

Still another object of the present invention is the provision of a cutting apparatus of the type described having improved turbine wheel means for actuation by gases under pressure produced by the burning of a propellant in a confined chamber.

A further object of the present invention is the provision of a cutting apparatus of the type described having improved means for controlling the rotational speed of the turbine wheel.

Still another object of the present invention is the provision of a cutting apparatus of the type described having improved clutch means operable to drive the cutter only when a predetermined gas pressure is acting upon the turbine wheel.

Still another object of the present invention is the provision of a cutting apparatus of the type described having means for controlling the operation of the clutch means.

Still another object of the present invention is the provision of an improved propellant container construction suitable to provide power to operate a driven cutting mechanism.

Still another object of the present invention is the provision of a propellant container of the type described having improved means for detachably engaging the same with the housing of a cutting mechanism.

Still another object of the present invention is the provision of an improved sealing means for effecting a seal between a propellant container and a cutting mechanism which is operable in response to the operating pressures within the mechanism.

These and other objects of the present invention will become more apparent during the course of the following detailed description and appended claims.

The invention may best be understood with reference to the accompanying drawings wherein an illustrative embodiment is shown.

In the drawings:

FIGURE 9 is an enlarged fragmentary cross-sectional view taken along the line 9—9 of FIGURE 6;

FIGURE 12 is an enlarged fragmentary cross-sectional view taken along the line 12—12 of FIGURE 1; and FIGURE 13 is a cross-sectional view taken along the line 13—13 of FIGURE 2.

Figure 1:
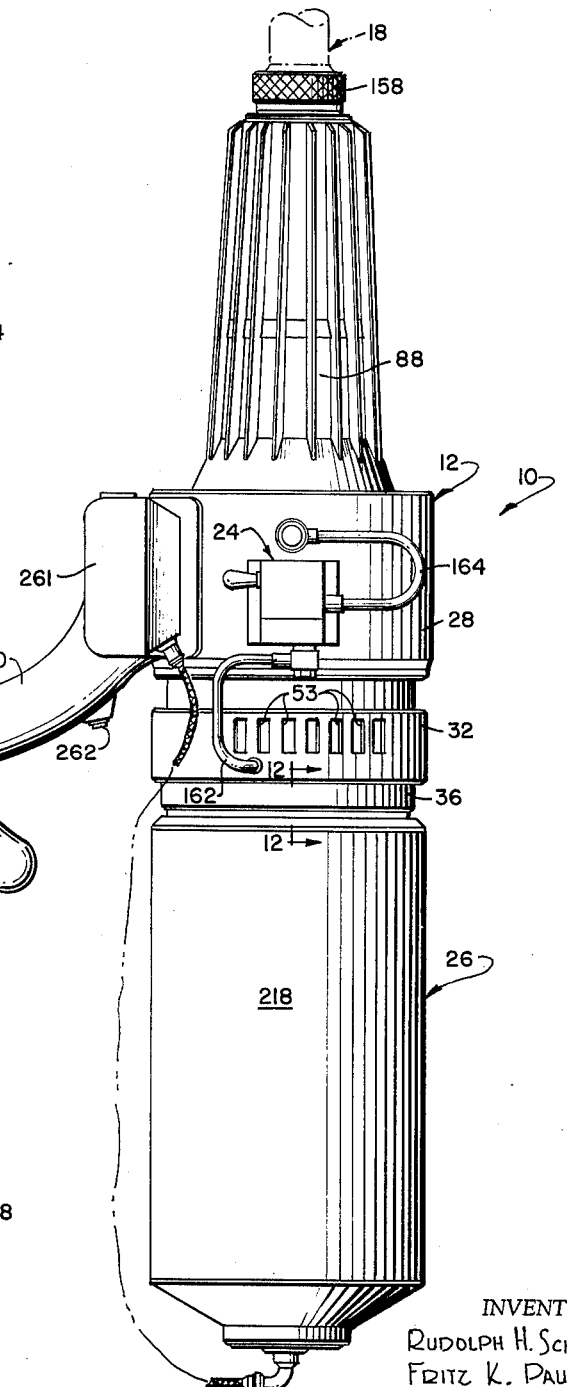
FIGURE 1 is a side elevational view of a cutting apparatus embodying the principles of the present invention.
Figure 2:
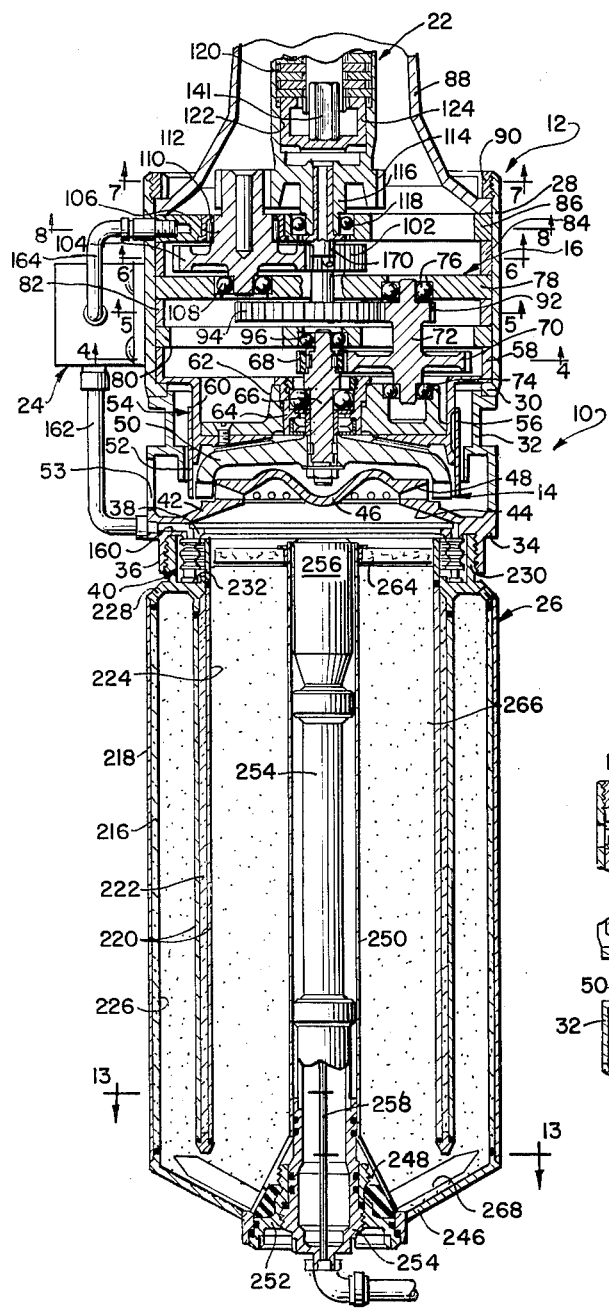
FIGURE 2 is a fragmentary vertical sectional view of the apparatus.
Figure 3:
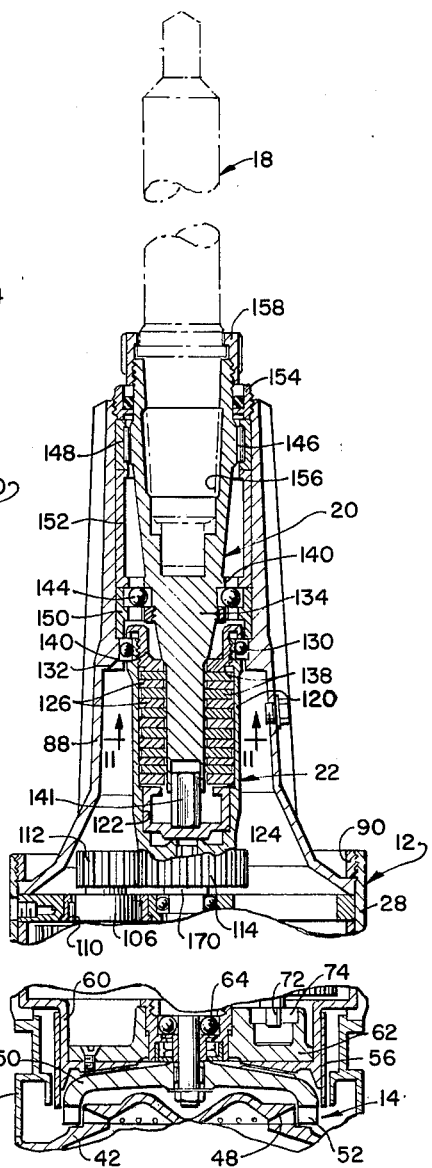
FIGURE 3 is a fragmentary cross-sectional view of the apparatus illustrating the cutter engaging head portion thereof.

Referring now more particularly to the drawings, there is shown in FIGURES 1 through 3 a cutting apparatus or device, generally indicated at 10, which embodies the principles of the present invention. In general, the device comprises a main housing or frame 12 having a turbine wheel assembly, generally indicated at 14, mounted in one end thereof and a motion transmitting mechanism assembly, generally indicated at 16, mounted therein in cooperating relation with the turbine wheel assembly 14. The motion transmitting mechanism assembly 16 is operable to effect driven rotation of a suitable cutting tool, indicated in phantom lines at 18 in FIGURES 1 and 3. A tool-receiving assembly, generally indicated at 20, of a construction suitable to receive the cutting tool is mounted within the housing and has a clutch assembly, generally indicated at 22, operatively connected therewith and with the motion transmitting mechanism assembly 16.

Preferably, the clutch assembly 22 is of the type which is activated in response to the application of a predetermined elevated gas pressure to the turbine wheel assembly 14 and a valve mechanism, generally indicated at 24, is provided for controlling the operation of the clutch assembly 22.

The housing 12 which receives the turbine wheel assembly 14, the motion transmitting mechanism assembly 16, the clutch assembly 22, and the tool-receiving means 20, is adapted to detachably receive a propellant container assembly, generally indicated at 26. The propellant container assembly 26 is operable upon ignition to supply gases under pressure to the turbine wheel assembly 14 to drive the latter. The driving of the turbine wheel assembly in turn will effect a driving of the tool-receiving assembly 20 through the operation of the motion transmitting mechanism assembly 16, the clutch assembly 22 and the valve mechanism 24.

The housing 12 may be of any suitable construction and, as best shown in FIGURE 2, comprises a central cylindrical housing member 28 arranged to receive the motion transmitting mechanism assembly 16. An inturned flange 30 is formed on one end of the housing member 28 and has fixedly secured thereto, by any suitable means such as welding, bolts, or the like, one end of an intermediate housing section 32, the opposite end of which is fixedly secured, as by welding or the like, to a container receiving housing section 34. The housing section 34 includes an interiorly threaded annular end portion 36 for receiving the container assembly 26 and an annular sealing portion 38 disposed inwardly of the portion 36 which is arranged to receive a sealing assembly, generally indicated at 40, for providing a gas tight seal between the housing 12 and the container assembly 26. Extending upwardly and inwardly from the annular sealing portion 38 is a frusto-conical wall portion 42 which defines with the annular sealing portion 38 as gas inlet chamber 44. The upper surface of the annular wall 42 has rigidly secured thereto, as by bolts or the like, a closure member 46 which defines with the wall 42 a plurality of circumferentially spaced, generally radially extending nozzles 48 which communicate the inlet gas chamber 44 with the turbine wheel assembly 14.

The turbine wheel assembly 14 includes a turbine wheel 50 having its outer peripheral portion turned longitudinally downwardly and formed with a plurality of circumferentially spaced turbine wheel blades or teeth 52. The blades 52 are of conventional aerodynamic design arranged to receive the gases from the nozzles 48 and to direct such gases across the blades to thereby impart rotary motion to the turbine wheel 50. The housing section 34 is provided with a plurality of spaced openings 53, through which the gases passing across the blade may discharge from the device.

Preferably, the turbine wheel assembly 14 has a speed regulating assembly, generally indicated at 54, operatively connected therewith for controlling rotation of the turbine wheel in response to the rotational speed of the cutting tool 18. As shown, the speed regulating assembly 54 comprises a cylindrical skirt member 56 which is mounted in surrounding relation to the turbine wheel within the intermediate housing section 32 for longitudinal movement with respect to the turbine wheel blades 52 so as to control the flow of gases from the nozzles 48 across the turbine blades 52. In order to mount the cylindrical skirt 56 for movement in the manner indicated above, there is provided an annular spacer member 58 within the adjacent end of the cylindrical housing member 28 which is disposed in interior engagement with the inturned flange 30. The spacer member 58 includes a portion 60 which extends into the intermediate housing section 32 and is provided with an exterior cylindrical surface which engages the interior cylindrical surface of the skirt 56 so as to guide the latter longitudinally into cooperating surrounding relation with the turbine blades 52. Fixedly mounted within the portion 60 of the spacer member 58 is a mounting member 62 which, at its central portion, carries a bearing assembly 64 within which is journalled a shaft 66 keyed to the turbine wheel 50. The turbine wheel 50 is thus journalled for rotation through the shaft 66 and the bearing assembly 64.

Figure 4:
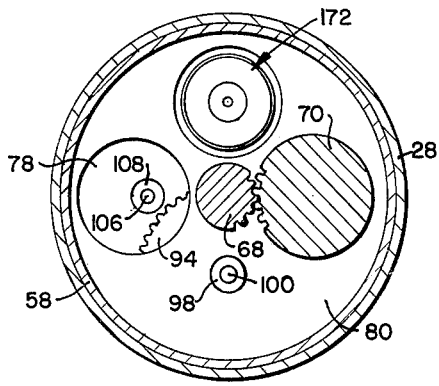
FIGURE 4 is a cross-sectional view taken along the line 4—4 of FIGURE 2.

The shaft 66 extends from the turbine wheel 50 into the cylindrical housing member 28 and has formed thereon a spur gear 68 which forms a part of the motion transmitting mechanism assembly 16. As best shown in FIGURES 2 and 4, the assembly 16 also includes a spur gear 70 disposed in meshing engagement with the gear 68 fixed on a shaft 72 having one end journalled in a bearing assembly 74 mounted in the member 62 and its opposite end journalled in a bearing assembly 76 carried by a spacer member 78 disposed within the cylindrical housing member 28.

The spacer member 78 and the spacer member 58 are fixedly mounted within the cylindrical housing member 28 in abutting relation to a plurality of additional spacer members 80, 82, 84, and 86. The outermost spacer member 86 engages the outwardly extending flanged end of a housing section 88, which flange end is retained, together with the spacer members in abutting relation within the cylindrical housing member 28 by means of a retainer ring 90 threadedly engaged within the opposite end of the cylindrical housing member 28, as shown in FIGURE 2.

Figure 5:
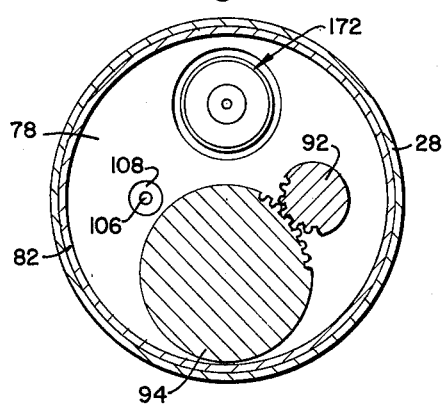
FIGURE 5 is a cross-sectional view taken along the line 5—5 of FIGURE 2.
Figure 6:
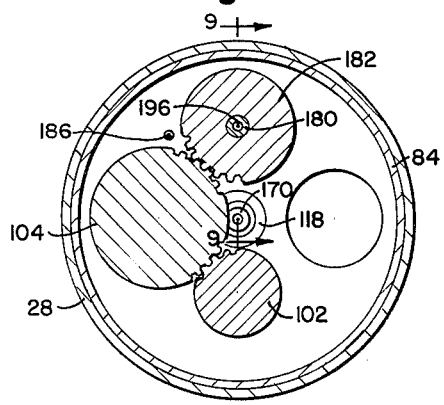
FIGURE 6 is a cross-sectional view taken along the line 6—6 of FIGURE 2.
Figure 7:
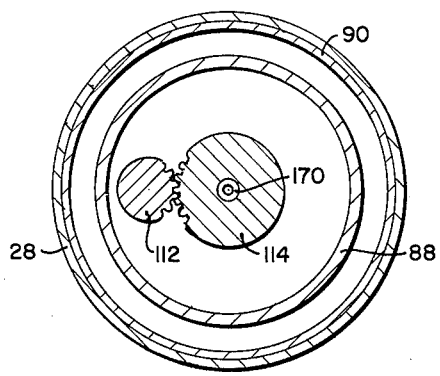
FIGURE 7 is a cross-sectional view taken along the line 7—7 of FIGURE 2.

The shaft 72 also has formed therein in a plane coincident with the spacer member 82 a small spur gear 92 which meshes with a large spur gear 94 as shown in FIGURE 5. The spacer member 80 is provided with a central bearing assembly 96 within which is journalled the opposite end of the turbine wheel shaft 66. The spacer member 80 also has mounted therein a bearing assembly 98 within which is journalled one end of a shaft 100 which has fixed thereto the large spur gear 94. The opposite end of the shaft 100 is journalled in a bearing assembly 101 mounted in the spacer member 86 and has formed thereon adjacent to the bearing assembly a spur gear 102 which meshes with a spur gear 104 fixed to a shaft 106 having one end journalled in a bearing assembly 108 carried by the spacer member 78 and an intermediate portion journalled in a bearing assembly 110 carried by the spacer member 86, as shown in FIGURE 6. The shaft 106 extends beyond the bearing assembly 110 and has formed thereon a spur gear 112 which meshes with a central spur gear 114 having a tubular shaft section 116 extending from one end thereof and journalled in a bearing assembly 118 carried by the spacer member 86, as shown in FIGURE 7.

Figure 11:
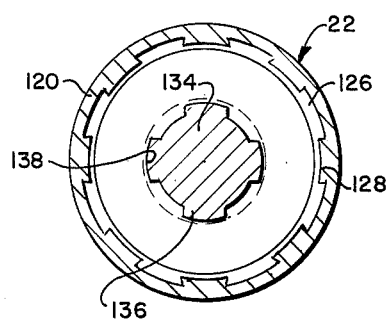
FIGURE 11 is an enlarged cross-sectional view taken along the line 11—11 of FIGURE 3.

Extending from the opposite end of the gear 114 is a tubular member 120 which forms a part of the clutch assembly 22. The tubular member 120 includes a portion adjacent the gear 114 which defines a cylindrical chamber 122 having slidably mounted therein a hollow piston 124. As best shown in FIGURES 3 and 9, the clutch assembly 22 includes a first series of spaced clutch discs 126 mounted within the tubular member 120 for longitudinal movement therein and against relative rotation with respect thereto as by a plurality of circumferentially spaced splines 128 formed on the interior periphery of the member 120 which engage with the registering grooves formed in the outer periphery of the discs 126. The outer extremity of the member 120 is journalled within a bearing assembly 130 carried by an inturned flange portion 132 of the housing section 88. Extending within the tubular member 120 is one end of an arbor member 134. As best shown in FIGURE 11, the end of the arbor member extending within the tubular member 120 is provided with a plurality of circumferentially spaced, longitudinally extending splines 136 arranged to engage within registering grooves formed in the interior periphery of a plurality of clutch discs 138 mounted between the clutch discs 126. The clutch discs 126 and 138 are retained against movement in a direction away from the chamber 122 by means of an annular closure member 140 threadedly mounted within the end of the tubular member 120. Compressive engagement of the disks is limited by a hexagonal bar 141 or the like disposed between the piston and the adjacent end of the arbor member, as shown in FIGURES 2 and 3.

The arbor member 134 may be of any suitable construction and forms a part of the tool-receiving means 20 previously described. As shown, the arbor member includes a central flange 142 which is arranged to receive a bearing assembly 144 and an outer cylindrical race portion 146 which is arranged to cooperate with an outer roller bearing assembly 148. The bearing assemblies 144 and 148 are suitably mounted within the housing section 88 by suitable spacer members, such as inner spacer member 150 and outer spacer member 152. The bearing assemblies and spacer members are fixedly mounted within the housing section 88 by a retainer ring 154 threadedly engaged within the interior outer end of the end of the housing section. The arbor member also includes a socket portion 156 for receiving the cutting tool 18 and has its outer end exteriorly threaded to receive a retaining ring 158 which serves to retain the tool within the socket portion 156.

It will be seen that the piston 124 will be actuated in a direction to frictionally engage the clutch discs 126 and 138 together in response to the application of gas pressure within the chamber 122. To this end, the inlet gas chamber 44 is communicated with the chamber 122 so that the clutch assembly will be actuated to drive the tool-receiving means 20 only when a predetermined elevated gas pressure exists in the inlet gas chamber 44. Any suitable means may be provided to effect this communication and as shown, the housing section 34 is provided with a radially extending opening 160 which communicates with the chamber 44 at its inner end and has its outer end connected with one end of a conduit 162. The opposite end of the conduit is connected with the valve mechanism 24. It will be understood that the valve mechanism 24 may be of conventional construction embodying a two-way valve which is capable in one position of communicating the conduit 162 with a conduit 164 and in a second position of interrupting such communication.

Figure 8:
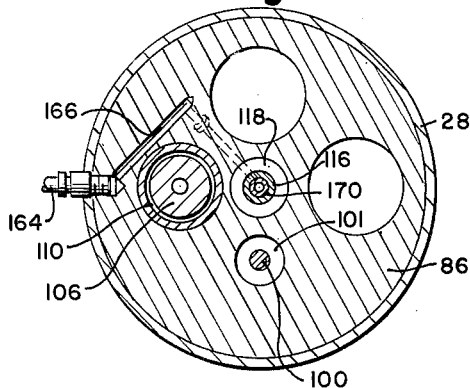
FIGURE 8 is a cross-sectional view taken along the line 8—8 of FIGURE 2.

As best shown in FIGURE 8, the conduit 164 has one end connected to the valve mechanism 24 and its opposite end connected with an opening 166 formed in the spacer member 86. The opening 166 extends angularly inwardly within the spacer member 86 and has its inner end connected with one end of a conduit 168 which, as shown in FIGURE 9, is connected through a suitable rotary fitting 170 extending through the hollow interior of the shaft 116 to the chamber 122.

Figure 10:
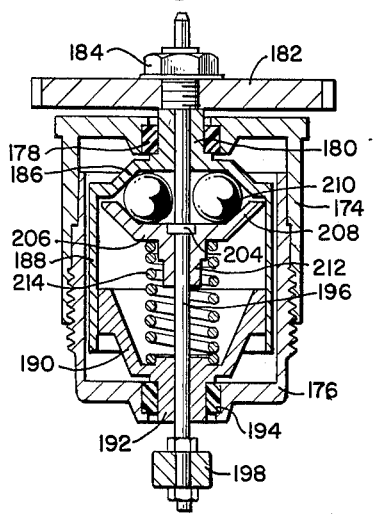
FIGURE 10 is a cross-sectional view taken along the line 10—10 of FIGURE 9.

Referring now more particularly to FIGURES 9 and 10, the speed regulating mechanism 54 also includes a speed sensing assembly, generally indicated at 172 for sensing the speed of the motion transmitting mechanism assembly 16 and effecting a longitudinal movement of the cylindrical skirt 56 in response to the speed sensed. The assembly 172 may be of any suitable construction and, as shown, comprises a first housing section 174 fixedly secured to the spacer member 78 and a second housing section 176 threadedly engaged within the section 174. Journalled within the housing section 174, as by bearing assembly 178, is a hollow shaft 180 having a spur gear 182 fixed to the outer end thereof by any suitable means such as a bolt 184. As best shown in FIGURE 6, the gear 182 is disposed in meshing engagement with the gear 94 so as to be rotated in response to the rotation of the gear 94.

Extending from the hollow shaft 180 within the housing section 174 is a frusto-conical flange portion 186 having a cylindrical sleeve portion 188 extending from the extremity thereof. Mounted within the sleeve portion 188 for rotation therewith is an annular member 190 having a hollow shaft section 192 extending therefrom and journalled in the housing section 176, as by a bearing assembly 194. Extending through the hollow shaft 180 and the hollow shaft section 192 is an elongated rod 196 one end of which is connected with the inner end of a bar 198 fixed to the cylindrical skirt 56 by any suitable means, such as bolt 200. The bar 198 extends inwardly from the skirt 56 through an appropriate elongated opening 202 formed in the adjacent portion 60 of the spacer member 58 and is connected with the rod 196 for relative rotation with respect thereto and for longitudinal movement in either direction therewith.

Formed on the rod 196 intermediate the ends thereof is a collar 204 which engages a member 206 mounted on the rod. The member 206 includes a frusto-conical flange portion 208 which cooperates with the frusto-conical flange portion 186 to form an annular chamber within which a plurality of circumferentially spaced balls 210 are mounted. The member 206 also includes a central hub portion 212 which extends within one end of a coil spring 214 the opposite end of which engages the annular member 190.

It can be seen that the members 180 and 190 will be rotated along with the gear 182 in response to the rotation of the motion transmitting mechanism assembly 16. Since the balls 210 are freely mounted between the frusto-conical flange portions 186 and 208, they will tend to move outwardly as a result of the centrifugal force applied thereto. In this way, the outward movement of the balls 210 is related to the rotational speed of the gear 182 and it will be noted that the outward movement of the balls will effect a movement of the member 206 against the action of spring 214 which in turn, through the rod 196, will effect a longitudinal movement of the cylindrical skirt 56 in a direction to move the skirt in surrounding relation to the turbine wheel blades and thus block the flow of gases across the blades. This blockage has the effect of changing the flow path of gases from the nozzles 48 across the turbine blades and thus reducing the forces acting on the blades and hence, reducing the rotational speed of the turbine wheel. This reduction in rotational speed of the turbine wheel is then sensed by the gear 182 and in this way the assembly 172 serves to regulate the speed of the turbine wheel. It will be noted that as load is applied to the cutting tool which would tend to decrease the speed thereof, the assembly 172 is operable to sense this reduction in speed and move the skirt 56 in a direction to permit greater flow of gases from the nozzles across the turbine blades. The assembly 172, therefore, is also operable to provide maximum power from the gases passing through the nozzles where the load applied to the cutting tool tends to slow down the rotational speed of the cutting tool.

The propellant container assembly 26 comprises an exterior cylindrical wall made up of a metallic sleeve 216 having a sleeve 218 of insulation mounted thereover and a concentric interior wall made up of spaced metallic sleeves 220 having a sleeve 222 of insulating material disposed therebetween. The inner and outer walls define an inner cylindrical chamber 224 which is open at one end for communication with the gas inlet chamber 44 within the housing 12 and an outer cylindrical chamber 226 which communicates with the inner chamber at its opposite end. Fixedly mounted, as by welding or the like, to the inlet chamber communicating end of the metallic sleeves 216 and 220 is a closure member 228 which closes the end of the chamber 226 opposite to that in communication with the chamber 224. The closure member 228 includes an exteriorly threaded flange portion 230 which is arranged to cooperate with the interiorly threaded portion 36 of the housing section 34. The closure member 228 also includes an annular sealing surface 232 which is disposed inwardly of the flange portion 230 and is arranged to cooperate with the sealing assembly 40.

As best shown in FIGURE 12, the sealing assembly 40 preferably comprises an annular sealing ring 234 of any suitable sealing material arranged to engage the sealing surface 232. Formed integrally with the sealing ring 234 and extending therefrom is a pair of concentric inner and outer walls 236 of bellows configuration, each having an interconnected sealing lip 238 on the opposite extremity thereof extending inwardly and connected with the other for engagement with the annular sealing portion 38 of the housing section 34. The ring 234, the spaced walls 236 of bellows configuration, and the lips 238 define an annular pressure chamber 240, having a plurality of circumferentially spaced elongated inlets 242 defined by the annular space between lips 238 between the integral interconnections thereof. The chamber 240 is communicated with the inlet gas chamber of the housing 12 through the inlets 142 by means of a plurality of circumferential spaced openings 244 which extend longitudinally within the sealing portion 38 from the gas chamber 44 to the annular opening 242.

The outer metallic sleeve 216, at the end thereof opposite from the closure member 28, has fixedly mounted thereon, as by welding or the like, a frusto-conical closure member 246 which is disposed in spaced relation to the adjacent end of the inner wall so as to provide a communicating passage between the inner and outer chambers. Fixed to the central portion of the closure member 246, as by a socket member 248, is one end of central tubular member 250 which extends into the inner chamber 224. The socket member 248 is interiorly threaded to receive an adaptor member 252 which sealingly engages the members 246 and 248 and is interiorly threaded to receive one end of an elongated sleeve 254 which extends within the tubular member 250. The opposite end of the sleeve 254 extends toward the open end of the chamber 224 adjacent the gas inlet chamber 44 of the housing 12 and has mounted therein an igniter 256 of conventional construction arranged to be actuated in response to the completion of an electrical circuit.

As shown, the igniter 256 is connected through leads 258 which extend through the sleeve 254 and outwardly to a handle assembly 260 mounted on the exterior of the housing 12, as shown in FIGURE 1. The handle assembly 260 has a conventional dry cell battery 261 encased therein and the leads 258 are connected in series with the battery and a button-actuated switch 262 carried by the handle assembly which, when manually depressed, serves to keep the circuit from the battery to the igniter 256. The igniter 256 is arranged to, in turn, ignite a star igniter 264 of disc construction, mounted in the open end of the chamber 224 so as to initiate the burning of a propellant 266 disposed within the chambers 224 and 226 evenly throughout the entire area thereof adjacent the open end of the chamber 224.

The propellant may be of any suitable material either liquid or solid as, for example, ammonium nitrate composition (AN–2011) having a $P_C$ of about 300 p.s.i. and a $T_C$ of about 1700° F., or solid propellant (CPN–135) having a $P_C$ of about 300 p.s.i. and a $T_C$ of about 1800° F. Where a solid propellant is utilized, it is preferable to form either a series of circumferentially spaced bores or an annular groove, as indicated at 268, in the propellant at a position disposed in the passage communicating the inner chamber with the outer chamber. The groove 268 serves to aid in the progressive burning of the propellant from the inner chamber to the outer chamber. It will be noted that when the star igniter is ignited, the propellant 266 will begin burning at a position adjacent the open end of the chamber 224 in communication with the gas inlet 44, and this burning will proceed progressively from the open end of the inner chamber 224 toward the opposite end thereof, through the passage between the inner chamber and the adjacent end of the outer chamber and then from the adjacent end of the outer chamber to the opposite end thereof.

OPERATION

The apparatus 10 of the present invention is adapted to be utilized in emergency situations to cut through airplane fuselages, automobile bodies, and train and boat bulkheads and to this end it is contemplated that the apparatus 10 could be employed as a standard piece of equipment in ambulances, air field crash trucks, and similar equipment. The apparatus would also be applicable as auxiliary equipment to fire-fighting apparatus and the like. It would also be useful as a tool within vehicles for use in emergencies by those trapped and hence could be placed within all airplanes, trains, automobiles, boats, alongside the fire extinguisher. The apparatus would have particular applicability to underwater salvaging operations.

The cutting tool 18 utilized may be of any conventional design, preferably of the type which is capable of cutting not only longitudinally but transversely as well. As to the portability of the present apparatus, it is contemplated that the apparatus could be limited in dimensions to approximately 34" in length and 5½" in diameter. The estimated weight of the apparatus without the cutting tool is 25 pounds, including the propellant charge enabling the user to easily manipulate the same by the handle assembly 260.

Utilizing solid propellant AN–2011, approximately 7 pounds of such propellant would provide a maximum horsepower performance of 45 for a duration of 100 to 220 seconds, assuming a burning rate of propellant of approximately 0.10 inch per second. Of course, any desired output speed of the tool can be utilized, and with the above example a cutting tool rotation of 1715 r.p.m. would produce 70.83 foot pounds of torque in which the gear reduction is 29 to 150.

In operation, the rotation of the cutting tool is initiated by pressing the button 262 which completes the electrical circuit to the igniter 256 through the battery 261 and leads 258. The igniter 256 commences the burning of the star igniter 264 which results in initial uniform burning of the propellant charge 266. As previously indicated, the propellant will burn progressively starting from a position adjacent the open end of the chamber 224 toward the opposite end of the chamber, then through the passage to the adjacent end of the outer chamber 226, and finally to the opposite end of the outer chamber. The gases under pressure created as a result of the propellant 266 are communicated directly to the inlet gas chamber 44. Gas pressure created in the inlet gas chamber 44 is immediately communicated with the seal assembly 40 through openings 244 so as to insure a pressure-tight seal between the propellant container 26 and the housing 12. In addition, the elevated pressure within the chamber 44 is communicated to the clutch chamber 122 through conduit 162, valve mechanism 24, conduit 164, passage 166, conduit 168 and fitting 170. The valve mechanism 24 is under the control of the operator and if it is desired to initiate the movement of the cutting tool the valve mechanism is moved by the operator into a position to communicate the elevated pressure in the chamber 44 to the clutch assembly so as to actuate the latter into the position shown in FIGURE 2 from the position shown in FIGURE 3.

It will also be understood that the gas pressure within the inlet chamber 44 will pass outwardly through the nozzles 48 and impinge upon the turbine blades 52, thus causing a rotation of the turbine wheel. The rotation of the turbine wheel is transmitted to the clutch assembly through the motion transmitting mechanism assembly 16 including meshing gears 68 and 70, 92 and 94, 102 and 104, and 112 and 114. Since the cutting tool 18 is fixedly carried by the arbor member 134 adapted to be rotated by the clutch assembly when the same is actuated, the cutting tool will be rotated in response to the burning of the propellant 266 within the container 26 so long as the valve mechanism 24 is disposed in its open position.

The speed of the turbine wheel is governed by the speed-regulating mechanism 54 in the manner indicated above. To briefly recapitulate, the assembly 172 is operable to sense the rotational speed of the motion-transmitting mechanism assembly 16 and to impart such speed to the centrifugal balls 210. The amount of outward movement of the balls 210 is directly proportioned to the rotational speed of the gear 182 and this outward movement in turn will effect a corresponding longitudinal movement of the skirt 56 through the rod 96 and its connection with the bar 198. It will be understood that the skirt 56 is movable between two limiting positions, one in which the outer periphery of the blades are completely enclosed (see FIGURE 2), so that the amount of gas flow directly across the blades from the nozzles 48 is minimized. In the other limiting position, the skirt permits free flow of the gases across the blades (see FIGURE 3). Of course, in the latter position, there will be a greater power applied to the turbine wheel and a higher rotational speed thereof. The speed regulating means is particularly applicable to supply maximum power in response to a reduction in the rotational speed of the cutting tool as a result of excessive loads thereon.

As indicated above, the power provided by the present apparatus and its true portability, make it capable of cutting through metallic fuselages, body sections and bulkheads, which present the most severe access problems in emergency situations.

It thus will be seen that the objects of this invention have been fully effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim.

1. A portable self-contained rotary cutting device comprising a housing having a turbine wheel journaled therein, nozzle means adjacent said turbine wheel for directing a gas under pressure onto said turbine wheel to rotate the latter, a container having a propellant charge therein detachably connected to said housing with sad propellant charge in communication with said nozzle means, means for igniting the charge within said container to thereby create gases under pressure therein for passage through said nozzle means, means journaled in said housing for detachably fixedly receiving a rotary cutting tool and motion transmission means within said housing operatively connected between said turbine wheel and said cutting tool receiving means for transmitting the rotary motion of the former to the latter, said motion transmission means including pressure actuated clutch means operatively connected between said tool receiving means and said turbine wheel for rotatably drivingly connecting and disconnecting said tool receiving means with said turbine wheel in response to the communication of fluid pressure thereto and exhaust of fluid pressure therefrom and means for controlling the communication of the pressure in said container to and exhaust of pressure from said pressure actuated clutch means.

2. A portable self-contained rotary cutting device comprising a housing having a turbine wheel journaled therein, nozzle means adjacent said turbine wheel for directing a gas under pressure onto said turbine wheel to to rotate the latter, a container having a propellant charge therein detachably connected to said housing with said propellant charge in communication with said nozzle means, means for igniting the charge within said container to thereby create gases under pressure therein for passage through said nozzle means, means journaled in said housing for detachably fixedly receiving a rotary cutting tool and motion transmission means within said housing operatively connected between said turbine wheel and said cutting tool receiving means for transmitting the rotary motion of the former to the latter, said turbine wheel including a plurality of circumferentially spaced turbine blades, means moveable adjacent said blades for varying the flow of gases from said nozzle means across said turbine blades, and means operable in response to the rotational speed of said turbine wheel for moving said flow varying means.

3. A portable self-contained rotary cutting device comprising a housing having a turbine wheel journaled therein, nozzle means adjacent said turbine wheel for directing a gas under pressure onto said turbine wheel to rotate the latter, a container having a propellant charge therein detachably connected to said housing with said propellant charge in communication with said nozzle means, means for igniting the charge within said container to thereby create gases under pressure therein for passage through said nozzle means, means journaled in said housing for detachably fixedly receiving a rotary cutting tool and motion transmission means within said housing operatively connected between said turbine wheel and said cutting tool receiving means for transmitting the rotary motion of the former to the latter, said housing including annular sealing means for expanding into pressure-tight engagement with said container in response to a predetermined gas pressure within said container.

4. A rotary cutter as defined in claim 3 wherein said annular sealing means comprises a sealing ring arranged to engage an annular seat on said container, said sealing ring having concentric bellows-shaped wall portions extending therefrom engaging said housing and defining an annular sealing chamber, and means communicating said annular sealing chamber with said container.

5. A portable self-contained rotary cutting device comprising a housing having a turbine wheel journaled therein, nozzle means adjacent said turbine wheel for directing a gas under pressure onto said turbine wheel to rotate the latter, a container having a propellant charge therein detachably connected to said housing with said propellant charge in communication with said nozzle means, means for igniting the charge within said container to thereby create gases under pressure therein for passage through said nozzle means, means journaled in said housing for detachably fixedly receiving a rotary cutting tool and motion transmission means within said housing operatively connected between said turbine wheel and said cutting tool receiving means for transmitting the rotary motion of the former to the latter, said container including an outer peripheral wall, an inner peripheral wall open at both ends extending within said outer peripheral wall in spaced relation thereto so as to define inner and outer chambers within said outer peripheral wall, means extending between one end of said inner and outer peripheral walls securing the same together in spaced relation and closing the adjacent end of said outer chamber, means secured to the opposite end of said outer peripheral wall in spaced relation to said inner peripheral wall defining an annular passage between said chambers communicating the same, means for insulating said walls, said propellant charge being disposed within both of said chambers, said container being secured to said housing with said one end of said inner wall in communication with said nozzle means, said igniting means being operable to ignite said charge at a position adjacent said one end of said inner wall whereby said charge will burn progressively from said one end of said inner chamber to the end thereof communicating with said outer chamber, through said passage, and then from the communicating end of said outer chamber to the closest end thereof.

6. A portable self-contained rotary cutting device comprising a cylindrical housing having a gas inlet chamber adjacent one end thereof, a turbine wheel journaled within said housing having a plurality of circumferentially spaced turbine blades thereon, nozzle means between said inlet chamber and said turbine blades for directing gas under pressure from said inlet chamber onto said turbine blades in a radially outwardly direction across the same, a cylindrical wall mounted in said housing for longitudinal movement in surrounding relation to the outer periphery of said turbine blades so as to control the flow of gas across said blades in accordance with the position relative thereto, means for effecting longitudinal movement of said cylindrical wall in response to the rotational speed of said turbine wheel, a container having a propellant charge therein detachably connected to said housing with said propellant charge in communication with said inlet chamber, means for igniting the charge within said container to thereby create gases under pressure therein for communication with said inlet chamber, pressure actuated sealing means carried by said housing and communicating with said inlet chamber for expansion into pressure-tight engagement with said container in response to a predetermined gas pressure within said chamber, means in the opposite end of said housing for detachably fixedly receiving a rotary cutting tool, means including a pressure actuated clutch operatively connected between said tool receiving means and said turbine wheel for transmitting the rotary motion of the latter to the former, conduit means communicating said inlet chamber with said pressure actuated clutch means and valve means in said conduit means controlling the communication of said inlet chamber with said pressure actuated clutch means.

7. Apparatus of the type described comprising a container having an outer peripheral wall, an inner peripheral wall open at both ends extending within said outer peripheral wall in spaced relation thereto so as to define inner and outer chambers within said outer peripheral wall, means extending between one end of said inner and outer peripheral walls securing the same together in spaced relation and closing the adjacent end of said outer chamber, means secured to the opposite end of said outer peripheral wall in spaced relation to said inner peripheral wall defining an annular passage between said chambers communicating the same, means for insulating said walls, a propellant charge disposed within said chambers, and means for igniting said charge at a position adjacent said one end of said inner wall whereby said charge will burn progressively from said one end of said inner chamber to the end thereof communicating with said outer chamber and through said passage and then from the communicating end of said outer chamber to the closed end thereof.

8. Apparatus as defined in claim 7 wherein said propellant charge is of solid material having an annular groove formed in the end thereof adjacent the communicating ends of said chambers, said annular groove extending through said passage.

9. Apparatus as defined in claim 7 wherein said container includes means surrounding said one end of said inner peripheral wall for securing said container to the housing of a pressurized gas driven device.

10. Apparatus as defined in claim 7 wherein said means secured to the opposite end of said outer peripheral wall includes a hollow tubular member extending within said inner chamber from said opposite end to said one end thereof, said igniting means including an electrically actuated igniter positioned adjacent said one end of said tubular member and electrical wires, operatively connected to said igniter and extending outwardly through the opposite end of said tubular member.

11. Apparatus for converting energy of gases under pressure created by ignition of a propellant charge within a container to rotary motion of a cutting tool comprising a housing having a gas inlet chamber, means on said housing for detachably securing thereto a container having a propellant charge therein in a position such that upon ignition of the propellant charge the gases under pressure created thereby will be communicated with said inlet chamber, a turbine wheel journaled in said housing, nozzle means between said inlet chamber and said turbine wheel for directing the bases under pressure in said chamber onto said turbine wheel to rotate the latter, means journaled in said housing for detachably fixedly receiving a cutting tool, and motion transmitting means in said housing for drivingly connecting said turbine wheel with said cutting tool receiving means, said motion transmission means including, pressure actuated clutch means operatively connected between said tool receiving means and said turbine wheel for rotatably drivingly connecting and disconnecting said tool receiving means with said turbine wheel in response to the communication of fluid pressure thereto and exhaust of fluid pressure therefrom and means for controlling the communication of the pressure in said chamber to and exhaust of pressure from said pressure actuated clutch means.

12. Apparatus as defined in claim 11 wherein said turbine wheel includes a plurality of circumferentially spaced turbine blades, means moveable adjacent said blades for varying the flow of gases from said nozzle means across said turbine blades, and means operable in response to the rotational speed of said turbine wheel for moving said flow varying means.

13. Apparatus as defined in claim 12 wherein said housing includes annular sealing means for expanding into pressure-tight engagement with said container in response to a predetermined gas pressure within said gas inlet chamber.

14. Apparatus for converting energy of gases under pressure created by ignition of a propellant charge within a container to rotary motion of a cutting tool comprising a housing having a gas inlet chamber, means on said housing for detachably securing thereto a container having a propellant charge therein in a position such that upon ignition of the propellant charge the gases under pressure created thereby will be communicated with said inlet chamber, a turbine wheel journaled in said housing, nozzle means between said inlet chamber and said turbine wheel for directing the gases under pressure in said chamber onto said turbine wheel to rotate the latter, means journaled in said housing for detachably fixedly receiving a cutting tool, motion transmitting means in said housing for drivingly connecting said turbine wheel with said cutting tool receiving means, said motion transmitting means including pressure actuated clutch means for controlling the rotation of said tool receiving means in response to the communication of fluid pressure therewith and exhaust of fluid pressure therefrom, conduit means for communicating said inlet chamber with said pressure actuated clutch means, and valve means in said conduit means for controlling the communication of said inlet chamber with said pressure actuated clutch means and the exhaust of pressure from said pressure actuated clutch means.

15. Apparatus for converting energy of gases under pressure created by ignition of a propellant charge within a container to mechanical motion comprising a housing having a gas inlet chamber, means on said housing for detachably securing thereto a container having a propellant charge therein in a position such that upon ignition of the propellant charge the gases under pressure created thereby will be communicated with said inlet chamber, annular seal means carried by said housing in surrounding relation to said inlet chamber expansible into pressure-tight engagement with the container in response to a predetermined elevated gas pressure within said inlet chamber, a turbine wheel journaled in said housing, nozzle means between said inlet chamber and said turbine wheel for directing the gases under pressure in said chamber onto said turbine wheel to rotate the latter.

16. Apparatus for converting energy of gases under pressure created by ignition of a propellant charge within a container to mechanical motion comprising a housing having a gas inlet chamber, means on said housing for detachably securing thereto a container having a propellant charge therein in a position such that upon ignition of the propellant charge the gases under pressure created thereby will be communicated with said inlet chamber, annular seal means carried by said housing in surrounding relation to said inlet chamber expansible into pressure-tight engagement with the container in response to a predetermined elevated gas pressure within said inlet chamber, a turbine wheel journaled in said housing, nozzle means between said inlet chamber and said turbine wheel for directing the gases under pressure in said chamber onto said turbine wheel to rotate the latter, said annular sealing means comprising a sealing ring arranged to engage an annular seat on said container, said sealing ring having concentric bellows-shaped wall portions extending therefrom engaging said housing and defining an annular sealing chamber, and means communicating said annular sealing chamber with said gas inlet chamber.

17. Apparatus for converting energy of gases under pressure created by ignition of a propellant charge within a container to mechanical motion comprising a housing having a gas inlet chamber, means on said housing for detachably securing thereto a container having a propellant charge therein in a position such that upon ignition of the propellant charge the gases under pressure created thereby will be communicated with said inlet chamber, a turbine wheel journaled in said housing and having a plurality of circumferentially spaced turbine blades thereon, nozzle means between said inlet chamber and said blades for directing gas under pressure from said inlet chamber across said turbine blades to rotate said turbine wheel, means movable adjacent said blades for varying the flow of gases across said turbine blades from said nozzle means, and means operable in response to the rotational speed of said turbine wheel for moving said flow varying means.

References Cited by the Examiner
UNITED STATES PATENTS

| | | | |
|---|---|---|---|
| 1,634,801 | 7/1927 | Schneider | 192—.02 |
| 1,838,700 | 12/1931 | Meyer | 192—.096 |
| 2,238,578 | 4/1941 | Burkeman. | |
| 2,620,627 | 12/1952 | Nardone | 60—39.47 |

DON A. WAITE, *Primary Examiner.*

BROUGHTON G. DURHAM, *Examiner.*